US009426298B2

(12) United States Patent
Odinak

(10) Patent No.: US 9,426,298 B2
(45) Date of Patent: Aug. 23, 2016

(54) COMPUTER-IMPLEMENTED SYSTEM AND METHOD FOR DISTRIBUTING MESSAGES BY DISCUSSION GROUP

(71) Applicant: Intellisist, Inc., Seattle, WA (US)

(72) Inventor: Gilad Odinak, Bellevue, WA (US)

(73) Assignee: Intellisist, Inc., Seattle, WA (US)

( * ) Notice: Subject to any disclaimer, the term of this patent is extended or adjusted under 35 U.S.C. 154(b) by 0 days.

(21) Appl. No.: 14/993,050

(22) Filed: Jan. 11, 2016

(65) Prior Publication Data

US 2016/0127558 A1     May 5, 2016

Related U.S. Application Data

(63) Continuation of application No. 14/589,818, filed on Jan. 5, 2015, now Pat. No. 9,237,237, which is a continuation of application No. 14/010,510, filed on Aug. 26, 2013, now Pat. No. 8,929,516, which is a continuation of application No. 13/544,976, filed on Jul. 9, 2012, now Pat. No. 8,520,813, which is a continuation of application No. 12/391,191, filed on Feb. 23, 2009, now Pat. No. 8,218,737, which is a continuation of application No. 10/719,452, filed on Nov. 21, 2003, now Pat. No. 7,496,353.

(60) Provisional application No. 60/428,533, filed on Nov. 22, 2002.

(51) Int. Cl.
| | |
|---|---|
| *H04M 1/64* | (2006.01) |
| *H04M 3/533* | (2006.01) |
| *H04L 29/06* | (2006.01) |
| *H04M 3/56* | (2006.01) |
| *H04W 12/06* | (2009.01) |

(52) U.S. Cl.
CPC .......... *H04M 3/53333* (2013.01); *H04L 65/403* (2013.01); *H04M 3/563* (2013.01); *H04W 12/06* (2013.01)

(58) Field of Classification Search
CPC ........................................................ H04M 1/64
USPC .............. 455/515.1, 413, 514, 518, 519, 521; 379/68, 88.16, 88.17, 88.09, 88.1, 379/88.25, 88.22
See application file for complete search history.

(56) References Cited

U.S. PATENT DOCUMENTS

| | | | |
|---|---|---|---|
| 6,334,103 B1 | 12/2001 | Surace et al. | |
| 6,401,061 B1 | 6/2002 | Zieman | |
| 6,459,892 B2 | 10/2002 | Burgan et al. | |
| 6,487,277 B2 | 11/2002 | Beyda et al. | |
| 6,668,169 B2 | 12/2003 | Burgan et al. | |

(Continued)

FOREIGN PATENT DOCUMENTS

| | | |
|---|---|---|
| WO | 0030374 | 5/2000 |
| WO | 01/47218 | 6/2001 |

*Primary Examiner* — Olisa Anwah
(74) *Attorney, Agent, or Firm* — Patrick J. S. Inouye; Krista A. Wittman

(57) ABSTRACT

A computer-implemented system and method for distributing messages by discussion group is provided. Discussion groups are monitored. An identity of a participant in each of two or more of the discussion groups is verified. Voice signals are received from the participant and speech from the participant is distinguished from ambient noise and third-party conversations in the voice signals. One of the discussion groups, specified by the participant to be associated with the voice stream, is identified. The speech is transmitted as a voice message to other participants in the identified discussion group.

20 Claims, 5 Drawing Sheets

(56) References Cited

U.S. PATENT DOCUMENTS

| | | |
|---|---|---|
| 6,778,660 B2 | 8/2004 | Fromm |
| 6,917,799 B2 | 7/2005 | Ross et al. |
| 6,981,021 B2 | 12/2005 | Takakura et al. |
| 7,634,064 B2 * | 12/2009 | Odinak ................... G10L 15/30 379/406.03 |
| 2001/0031641 A1 | 10/2001 | Ung et al. |
| 2001/0053977 A1 | 12/2001 | Schaefer |
| 2002/0006126 A1 | 1/2002 | Johnson et al. |
| 2002/0077823 A1 | 6/2002 | Fox et al. |
| 2002/0188670 A1 | 12/2002 | Stringham |
| 2004/0162724 A1 | 8/2004 | Hill et al. |
| 2004/0179689 A1 * | 9/2004 | Maggenti ............ H04L 63/0428 380/270 |

* cited by examiner

60

70

90

COMPUTER-IMPLEMENTED SYSTEM AND METHOD FOR DISTRIBUTING MESSAGES BY DISCUSSION GROUP

CROSS-REFERENCE TO RELATED APPLICATIONS

This application is a continuation of U.S. Pat. No. 9,237,237, issued Jan. 12, 2016, which is a continuation of U.S. Pat. No. 8,929,516, issued Jan. 6, 2015, which is a continuation of U.S. Pat. No. 8,520,813, issued Aug. 27, 2013, which is a continuation of U.S. Pat. No. 8,218,737, issued Jul. 10, 2012, which is a continuation of U.S. Pat. No. 7,496,353, issued on Feb. 24, 2009, which claims priority to U.S. Provisional Patent Application, Ser. No. 60/428,533, filed Nov. 22, 2002, the disclosures of which are incorporated by reference.

FIELD

The present invention relates in general to message-based voice communications and, in particular, to a system and method for providing distributing messages by discussion group.

BACKGROUND

Historically, the spoken word has been the preferred and, prior to the advent of writing, principal medium for communication in human society, particularly for social networking. Writing evolved as an alternate medium for communication, beginning with ancient civilizations that needed to track food and livestock inventories. Unlike the spoken word, writing offered a more precise and persistent medium that functioned independently from the time and place of expression. Thus, even the earliest forms of writing allowed for so-called "time-shifting," which enables a message composed by a sender to be read at a later time by a recipient.

The advent of the electronic age greatly increased the evolution of enhanced forms of spoken and written communication. Currently, the telephone offers the mainstream technology for transacting voice communications with over 90% of the households in the United States having telephone service. In addition, wireless telephone usage has grown dramatically in the last decade with an estimated one billion wireless telephone users worldwide. Electronic mail (email) and text messaging offer the closest equivalent technology for written communication, spurred by the rapid growth and development of the Internet and the proliferation of personal computer usage. In 1999, an estimated 130 million people used email in the United State alone, with at least 600 million email users worldwide.

Traditionally, voice and text communications have followed different usage paradigms. Voice communications, via a telephone, are instantaneous, real-time, and primarily one-to-one communications methods. Written communications, via email, are time-shifted and offer one-to-many or many-to-many communication methods with an implied means for persistently chronicling communications through email storage.

Over time, both forms of communication have accumulated features reminiscent of the other. For instance, voicemail and conference calling respectively allow time-shifted and one-to-many or many-to-many voice communications. Analogously, voice mail attachments to conventional email messages allow instantaneous receipt of verbal communications contemporaneous to email message receipt.

Recently, text messaging, popularly referred to as Instant Messaging, introduced a new category of electronic written communications. Text messaging combines the immediacy of telephone voice communication with the textual format of email communications. Text messaging moves the email paradigm into near real-time by enabling users to compose and exchange messages during an interactive session. Text messaging provides a rapid form of two-way written communication that still allows a sender to review a message prior to dispatch. Additionally, the use of sessions enables group communication through chat forums and can be used to unilaterally inform users about the availability of other group members. This past year, there were over 220 million text messaging users worldwide.

Operationally, text messaging begins with a signed-on user composing a text message and dispatching the text message to another signed-on user. Upon receipt, the message is displayed on the screen of the recipient in a near-instantaneous fashion and the other user can compose a reply for dispatch back to the first user.

Text messaging has been implemented in several formats. Instant Messaging operates as an adjunct to traditional email clients as an add-on Internet-based application. The Short Messaging Service (SMS) is a wireless telephone variant of Instant Messaging, which has grown rapidly in popularity, especially in Europe. Independent of the type of text messaging employed, users are able to keep a log of transmitted and received messages.

Both telephonic and electronic written communications have helped society keep up with the accelerating pace of modern living and, at the same time, have contributed to this acceleration. For instance, wireless telephone and messaging communications now enable people to perform multiple tasks almost anywhere. However, both forms of communication have limitations. Telephone communication, for example, requires the full attention of the user and the ability to respond in real-time to the other party. Conversely, text messaging enables a user to defer sending a response until convenient, but requires the user to read each message on a display and to manually compose a response through typing, both difficult activities to perform while mobile.

Wireless push-to-talk voice communication is described in U.S. Pat. No. 6,917,799, issued Jul. 12, 2005, to Ross et al., the disclosure of which is incorporated by reference. A wireless telephone digitizes the voice of a user in response to the depression of a push-to-talk button, either physical or virtual. The digitized voice is sent to a base station, which places the data on a server. Other wireless telephones can recover the data for conversion back to digitized voice. However, users must activate the push-to-talk button to transact a voice communication and session-based voice communications between individual and ad hoc moderatable discussion groups are not contemplated.

A position-linked chat system, method and computer product, is described in U.S. Pat. No. 6,981,021, issued Dec. 27, 2005, to Takakura et al., the disclosure of which is incorporated by reference. A server device includes a chat room controller, which generates a plurality of chat rooms based on a geographical standard; a chat room selector, which selects a chat room in which a user on a specific terminal can participate based on information relating to the current position of that terminal, and a voice controller, which mixes voices of users transmitted from the terminals of respective users participating in the same chat room. However, session-based forms of voice messaging communication that flexibly allow participation in multiple, simultaneous and moderatable discussion groups are not contemplated.

Wireless chat automatic status tracking is described in U.S. Pat. No. 7,522,911 to Ung et al., issued Apr. 21, 2009, the disclosure of which is incorporated by reference. A technique and apparatus provide status tracking of a presence or location of a mobile wireless device, even outside of a particular wireless system. In one disclosed embodiment, a wireless chat tracking system utilizes a change in mobile registration status to automatically notify a chat group system outside the wireless network of current status information activity. However, session-based forms of voice messaging communication that flexibly allow participation in multiple, simultaneous and moderatable discussion groups are not contemplated.

Chat server and wireless chat devices are described in U.S. Pat. Nos. 6,459,892 and 6,668,169, both to Burgan et al., respectively issued on Jan. 1, 2002, and Dec. 23, 2003, the disclosures of which are incorporated by reference. A wireless communication system includes a system controller, radio frequency (RF) transmitter, RF receiver, transmit antenna, receive antenna, chat server, and a plurality of wireless communication devices. The chat server manages the communication of a plurality of chat discussions, facilitating substantially real-time communication among the wireless communication devices within the wireless communication system. However, users must activate the push-to-talk button to transact a voice communication and session-based voice communications between individual and ad hoc moderatable discussion groups are not contemplated.

Accordingly, there is a need for a system and method that provides flexible voice communications between a plurality of individuals and discussion groups, preferably through a centralized voice message server and personal communication device clients, which automatically detect voice communications responsive to a user activated "attention."

SUMMARY

One embodiment of the present invention provides a system and method for providing flexible message-based communications between two or more individuals logically interconnected over a centralized messaging infrastructure. A voice message server interfaces to a plurality of personal communication devices (PCDs) over a wireless data network. Each PCD includes an "Attention" button that alerts the PCD to begin processing voice messages. Voice messages are forwarded to the voice message server and are queued, stored and played to the user of the receiving PCD. Each user must be signed on in a voice messaging session and can participate in one or more moderatable and simultaneous discussion groups.

An embodiment provides a computer-implemented system and method for distributing messages by discussion group. Discussion groups are monitored. An identity of a participant in each of two or more of the discussion groups is verified. Voice signals are received from the participant and speech from the participant is distinguished from ambient noise and third-party conversations in the voice signals. One of the discussion groups, specified by the participant to be associated with the voice stream, is identified. The speech is transmitted as a voice message to other participants in the identified discussion group.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Multi-Party Message-Based Voice Communications System

Figure 1:
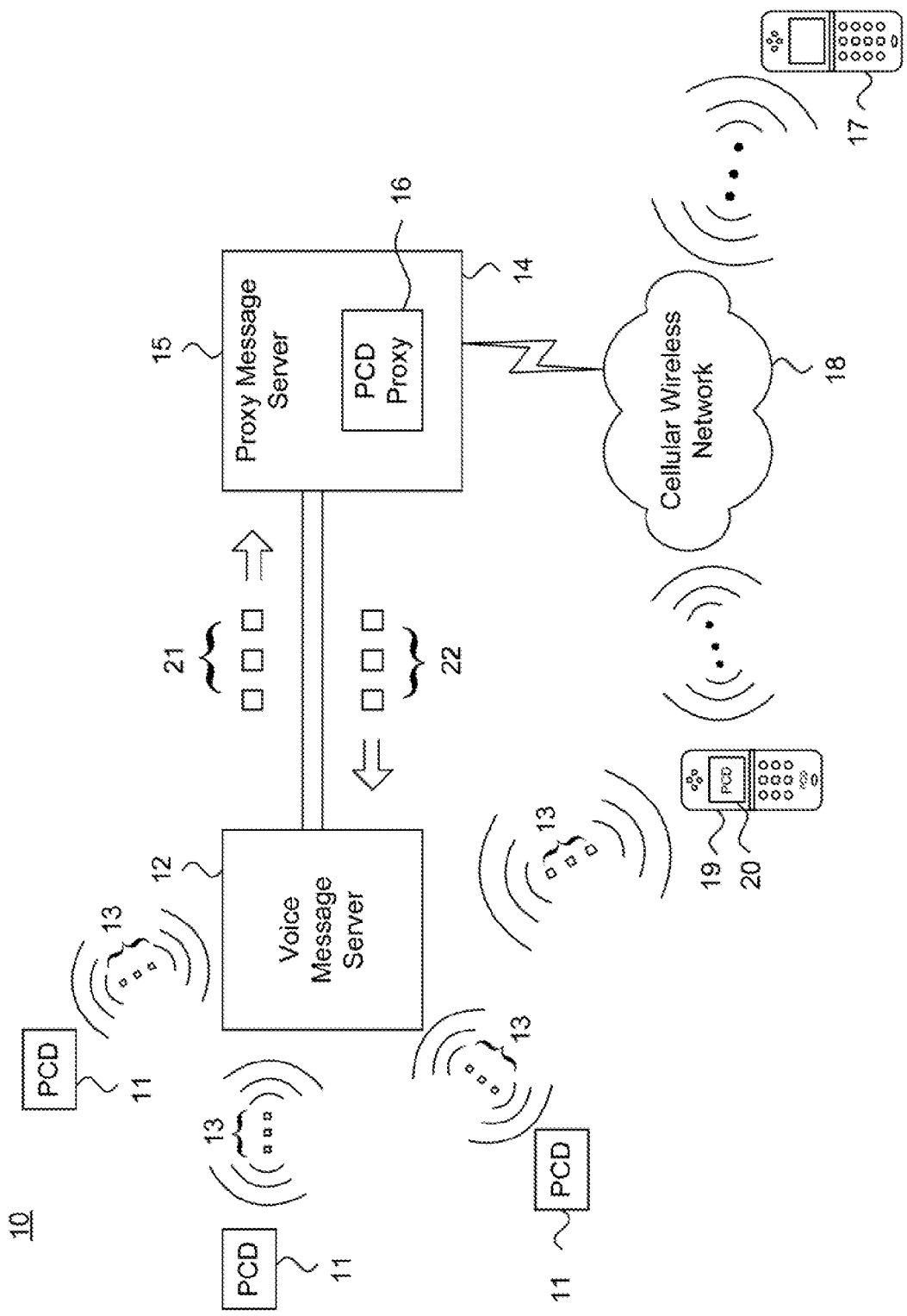
FIG. 1 is a block diagram showing a system for providing multi-party message-based voice communications, in accordance with the present invention.

FIG. 1 is a block diagram showing a system 10 for providing multi-party message-based voice communications, in accordance with the present invention. Multiple personal communication devices (PCDs) 11 are communicatively interfaced with a voice message server 12 over a wireless data network 14, such as the General Packet Radio Service (GPRS), to provide voice-messaging services. Other forms and configurations of wireless data networks are feasible, as would be recognized by one skilled in the art. Each PCD 11 provides voice communications through voice messaging by converting analog voice signals into digital voice messages 13 exchanged via a digital data stream transmitted over the wireless data network 14. PCDs 11 are further described below with reference to FIG. 2. The voice message server 12 provides message routing, security and session management, as further described below with reference to FIG. 6.

In an alternate embodiment, the functionality of a PCD is provided through a PCD proxy 16 located in a proxy message server 15. The proxy message server 15 operates in place of an actual PCD 11 and individual PCD proxies 16 are assigned to conventional cellular telephones 17 operating over a conventional cellular wireless network 18, as is known in the art. The PCD proxy 16 accepts incoming voice messages 21 received via the voice message server 12 to the cellular telephone 17 and forwards outgoing voice messages 22 received via the cellular telephone 17.

In a further alternate embodiment, PCD logic 20 is integrated directly into cellular telephones 19 operating over the conventional cellular wireless network 18 with the PCD logic 20 being communicatively interfaced with the voice message server 12 over the wireless data network 14. The PCD-enabled cellular telephone 19 provides conventional real-time cellular telephone service while the PCD logic 20 offers time-shiftable voice communications through voice messaging. Other configurations, topologies, and arrangements of PCDs 11, PCD proxies 16, PCD logic 20, cellular telephones 17 and 19, voice message servers 11, proxy message servers 15, and related system components and interconnections are feasible, as would be recognized by one skilled in the art.

Personal Communication Device

Figure 2:
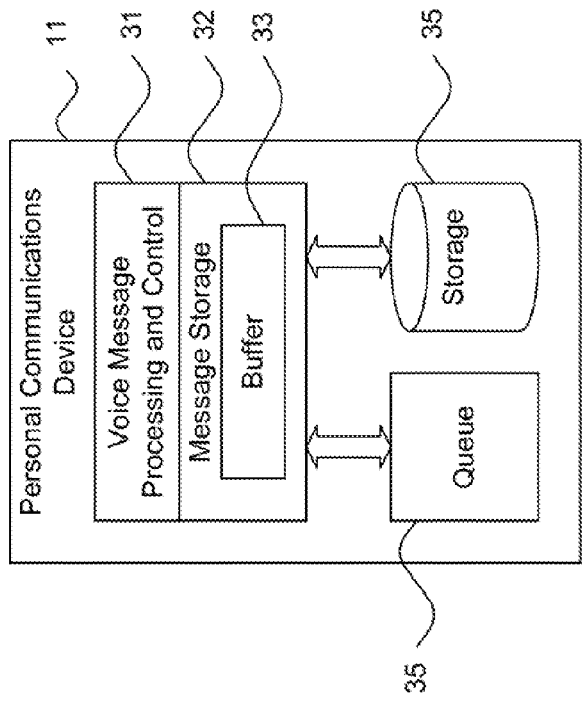
FIG. 2 is a block diagram showing the logical structure of a PCD for use in the system of FIG. 1.

FIG. 2 is a block diagram showing the logical structure 30 of a PCD 11 for use in the system 10 of FIG. 1. The PCD is functionally divided into a voice message processing and control module 31 and message storage module 32. The voice message processing and control module 31 includes logic for converting analog voice signals into digitized form, managing message queuing and storage, and controlling voice processing functions, including standby and active modes activated via an "Attention" button, as further described below with reference to FIG. 7. The message storage module 32 includes a message buffer 33 for assembling outgoing voice messages, a message queue 34 for transitorily storing voice messages, and a message store 35 for persistently storing saved voice messages.

Voice Message Processing

Figure 3:
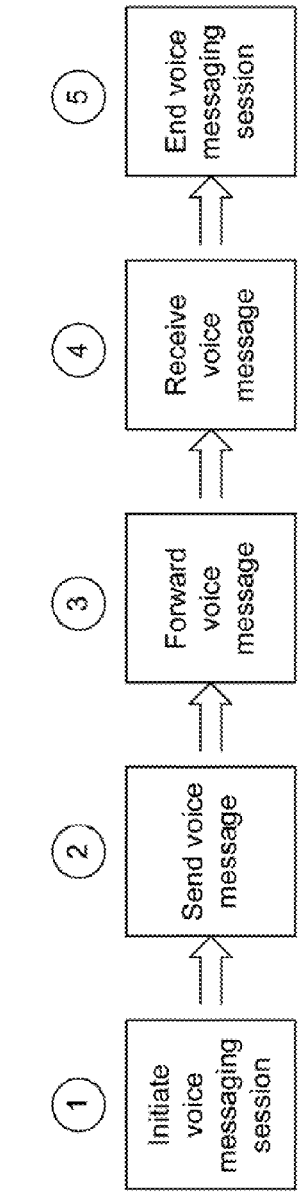
FIG. 3 is a process flow diagram showing the processing of a voice message by the system of FIG. 1.

FIG. 3 is a process flow diagram showing the processing 40 of a voice message 13 by the system 10 of FIG. 1. A user begins by signing into the voice message server 12 to initiate a voice messaging session (Step ①). The user then sends one or more voice messages 13 by speaking through the PCD 11 (Step ②). Typically, a copy of the sent voice message 13 will also be stored in the message store 35 of the PCD 11. Note that for purposes of discussion, a PCD 11 is referenced with respect to the processing 40 of a voice message 13, although the processing 40 could equally be performed by a PCD proxy 16 or PCD logic 20, as would be recognized by one skilled in the art. Accordingly, unless otherwise explicitly stated, references to PCD 11 will apply equally and interchangeably to the PCD proxy 16 and PCD logic 20.

The voice message server 12 then forwards the voice message 13 to the PCD 11 of the intended recipient or recipients (Step ③). Upon receipt, the receiving PCD 11 stores, queues and plays the received voice message to the user (Step ④). Likewise, the recipient user can send back a voice message 13 in reply and a voice message exchange will continue until the user terminates by signing out of the voice message server 12 to end the voice messaging session (Step ⑤).

The system 10 is fully symmetric in the sense that any user can send or receive messages at any time. A user can manipulate a PCD 11 to listen to previous voice messages 13 that have been sent or received and can also forward. edit and resend voice messages 13. In addition, a voice message 13 can be sent from one user to many users or from many users to many users, such as in a voice conference scenario. Importantly, the user interface of each PCD 11 enables time-shiftable voice communications through user controllable store and forward messaging functionality inherent to the PCDs 11, as well as in the voice message server 12, described below with reference to FIG. 6.

Individual and Group Session Management

Figure 4:
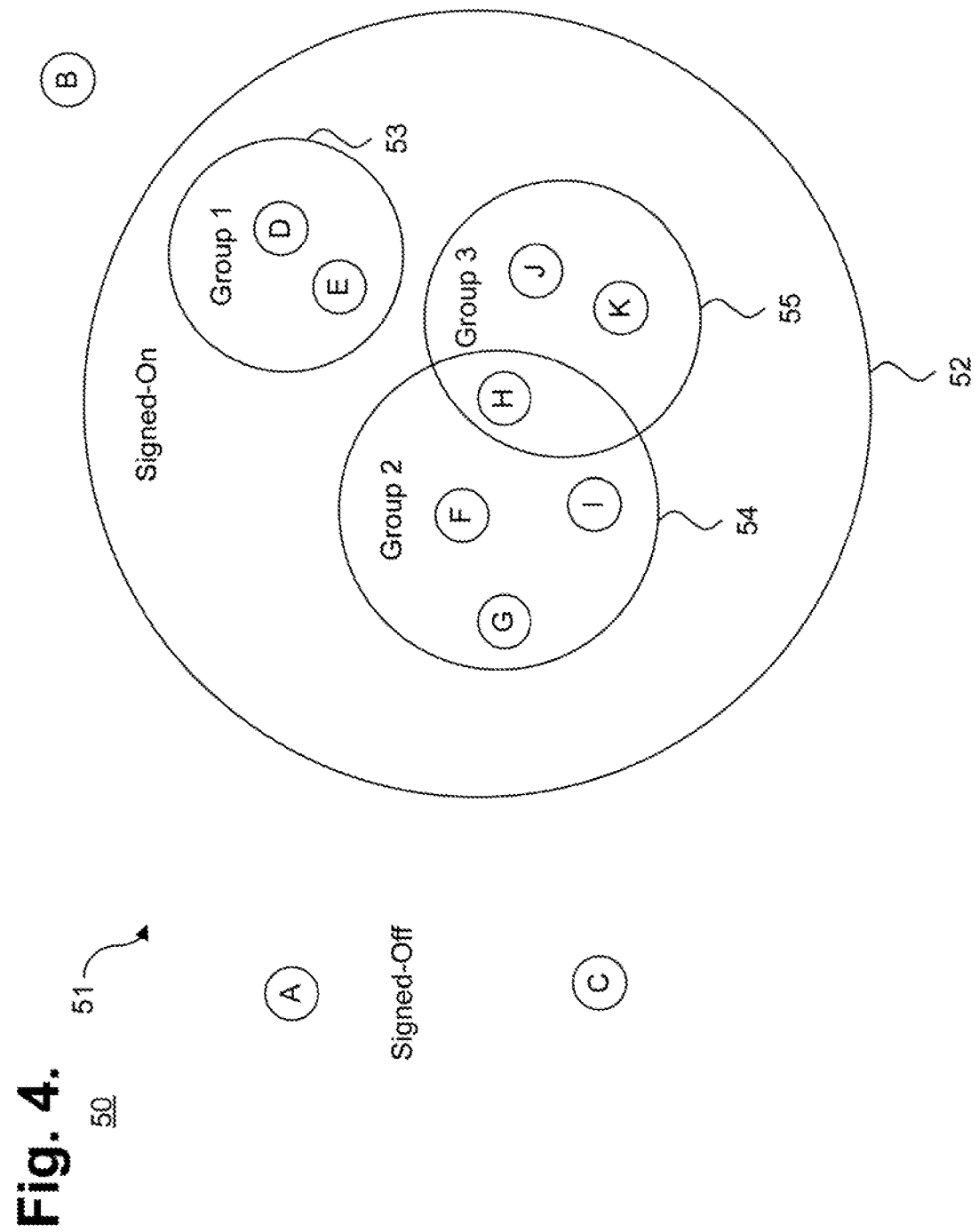
FIG. 4 is a Venn diagram showing individual and group relationships as managed by the system of FIG. 1.

FIG. 4 is a Venn diagram showing individual and group relationships 50 as managed by the system 10 of FIG. 1. Voice messaging is provided through user sessions during which a user of a PCD 11 is either signed on or signed off of a voice message server 12. The concept of a signed-on user functions independently from physical PCDs 11. The system 10 tracks sign-on users, which are each assigned to a voice messaging session. A signed-on user can be associated with one or more PCDs 11, and only signed-on users can receive or send voice messages 13.

A user is either signed-off 51 or signed-on 52. Here, Users A, B, and C are signed off while Users D though K are signed on. In addition, two or more users can participate in a discussion group 53, 54, 55. A discussion group 53, 54, 55 is a set of signed-on users who communicate between each other in a separate user session. When a member of a discussion group sends a voice message 13, all other members receive the same voice message 13. One-to-one communications are achieved by establishing a discussion group 53 that has exactly two users.

Users can join different discussion groups 53, 54, 55. More users can also join multiple discussion groups. Here, Users D and E participate in their own discussion group 53, Users F through I participate in another discussion group 54, and Users H, J, and K participate in yet another discussion group 55. Note User H is participating in two separate discussion groups, 54, 55. A user participating in multiple discussion groups 53, 54, 55 receives voice messages 13 from all of the groups. If a user specifies an active discussion group 53, 54, 55, a voice message 13 is sent only to the members of that group.

Voice Message Format

Figure 5:
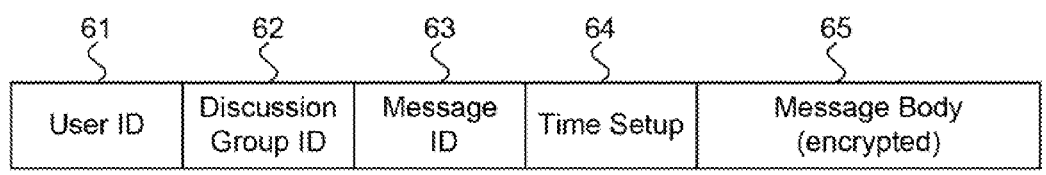
FIG. 5 is a data structure diagram showing a schema for organizing a voice message exchanged through the system of FIG. 1.

FIG. 5 is a data structure diagram showing a schema 60 for organizing a voice message 13 exchanged through the system 10 of FIG. 1. A voice message 13 is identified by at least a user ID 61 and a discussion group ID 62. Other types of identifiers are possible in addition to the user ID 61 and discussion group ID 62, as would be recognized by one skilled in the art. The voice message server 12 uses the user ID 61 and discussion group ID 62 in determining appropriate message processing.

In addition, in the described embodiment, each voice message 13 further includes a message ID 63 and time-stamp 64, preferably consisting of a standardized date and time marker, such as GMT. The actual digitized voice message is stored in the message body 65, preferably compressed in an encrypted form.

Voice Message Server

Figure 6:
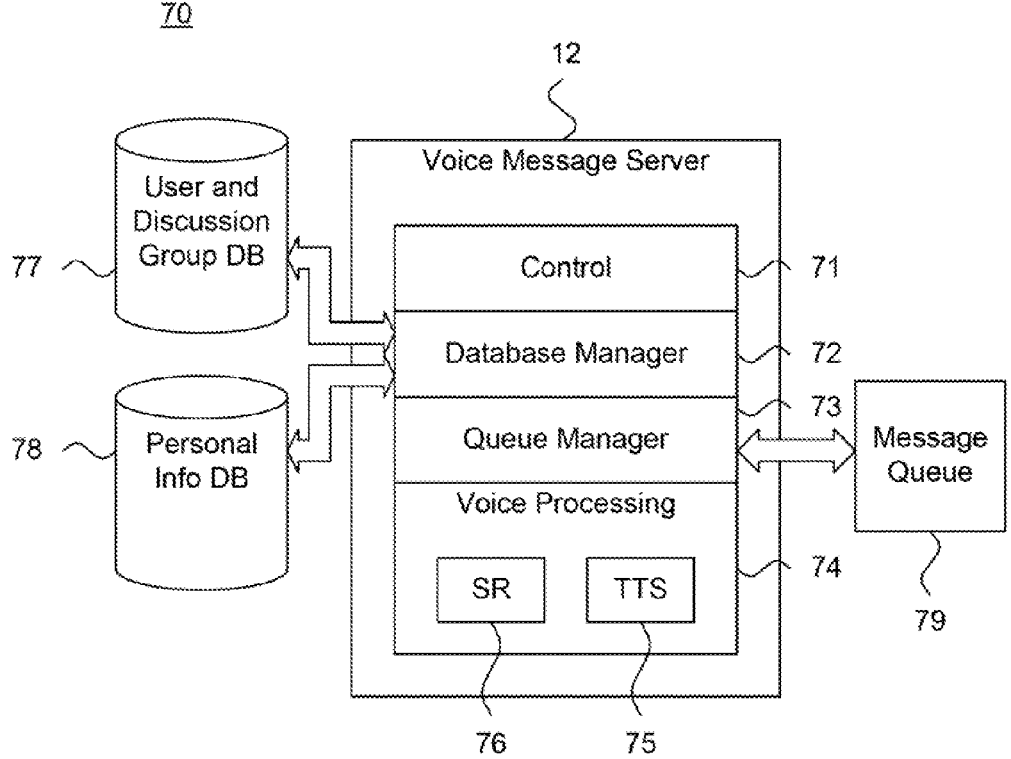
FIG. 6 is a block diagram showing the logical structure of a voice message server for use in the system of FIG. 1.

FIG. 6 is a block diagram showing the logical structure 70 of a voice message server 12 for use in the system 10 of FIG. 1. The voice message server 12 is logically structured into four modules. A control module 71 handles control messages received from PCDs 11 to handle sign-on, sign-off, and group discussion requests and other voice messaging commands.

A database manager module 72 interfaces with a voice message server 12 to two databases, a user and discussion group database 77 and a personal information database 78. The user and discussion group database 77 maintains a list of signed-on users and discussion groups. The personal information database 78 maintains personal information about system users that is used during sign-on.

A queue manager 73 performs the store-and-forward processing of transient voice messages 13, which are staged in a message queue 79 pending dispatch. Finally, a voice processing module 74 includes speech recognition 76 and text-to-speech 75 logic, as is known in the art. Note that the voice message server 12, in conjunction with the user interface of each PCD 11, enables time-shiftable voice communications through user controllable store and forward messaging functionality.

PCD Physical Component Structure

Figure 7:
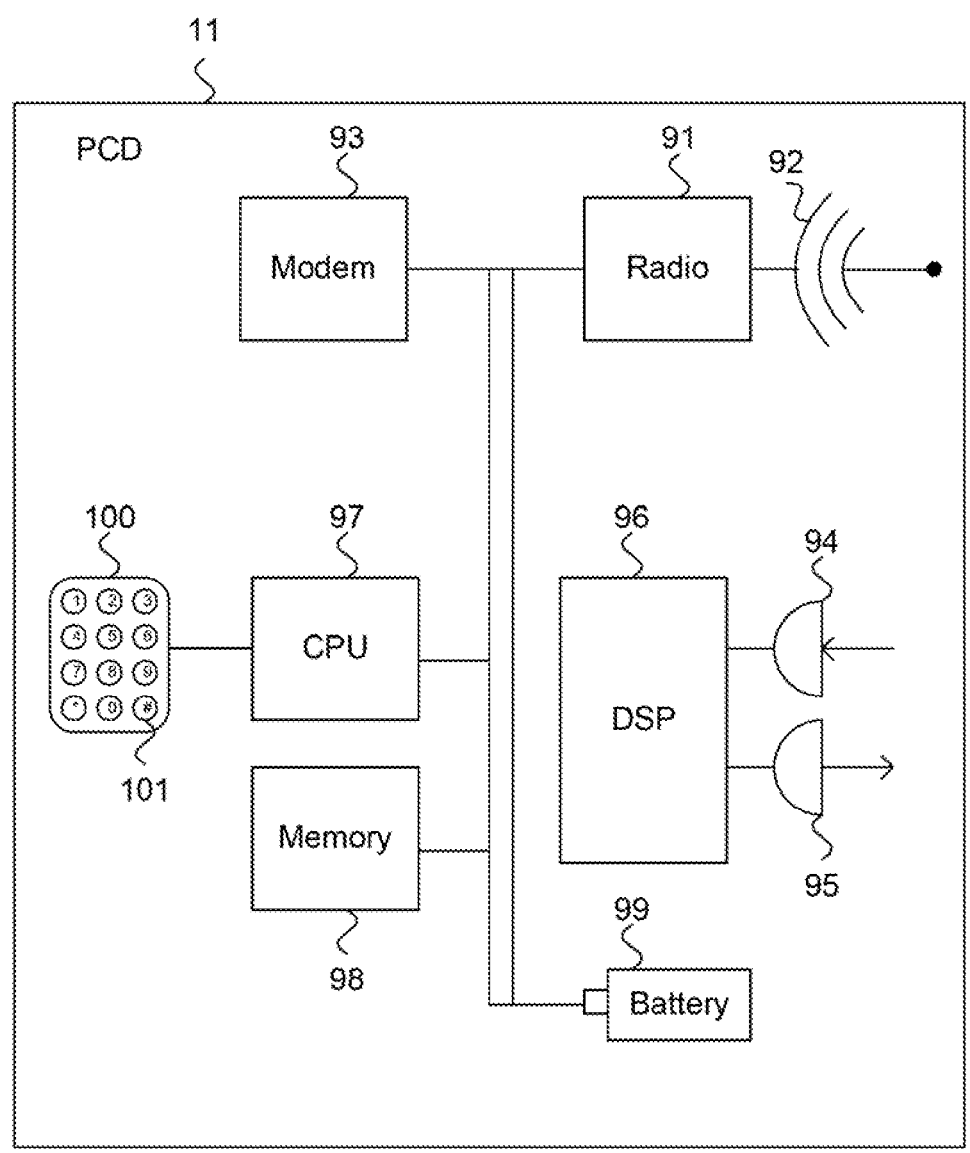
FIG. 7 is a block diagram showing the physical components of a PCD used by the system of FIG. 1.

FIG. 7 is a block diagram showing the physical components 90 of a PCD 11 used by the system 10 of FIG. 1. In the described embodiment, each PCD 11 comprises a wide area data network radio 91, antenna 92 and modem 93, a microphone 94 and an earphone or speaker 95, a digital signal processor (DSP) 96, a man-machine interface 100, such as buttons or a keypad, a central processor unit (CPU) 97, memory 98, and a battery or power source 99.

The man-machine interface 100 includes an "Attention" button 101, which is activated by a user to notify the PCD 11 to commence voice message processing. Unlike a push-to-talk button, the "Attention" button 101 transitions the PCD 11 from a standby mode into an active mode, whereby voice inputs are monitored and processed. The DSP 96 processes the voice signals to distinguish between speech and ambient noise and third-party conversations. The "Attention" button 101 can be used to temporarily deactivate the PCD 11 during a session when a continuous communication stream is not desired.

Sound is captured by the microphone 95 and transformed to an electrical signal. The digital signal processor 96 digitizes and processes the sound to remove noise and echo and to identify the beginning and ending points of speech. Each identified digitized sound segment is further encoded into one or more voice messages 13 that are sent over the wireless data network 14 to the message server 12.

In the described embodiment, each voice message 13 is numbered, time-stamped and identified by a user ID 61. Further, the voice messages 13 are preferably encrypted using secret keys known only to the PCD 11 and the voice message server 12 and compressed in an encrypted form. Similarly, voice messages 13 received by the PCD 11 from the voice message server 12 are decompressed, decrypted, concatenated if required, and converted into an electrical signal and played to the user via the earphone 95.

The PCD physical form factor can be in the form of self-contained headphones packaged as a small device clipped to clothing and connected via an electrical wire to a combination earphone and microphone ensemble.

In an alternate embodiment, the user uses a conventional landline or wireless cellular telephone that is in communication with a PCD proxy 16 over a telephone network. Typically, the PCD proxy 16 resides at a stationary location similar to that of the voice message server 12 and functions similarly to a PCD 11.

PCD proxies 16 lack the earphones and microphones and instead connect to the telephone network. Each PCD proxy 16 can receive sound from the telephone instrument and process the sound in the same manner as a PCD 11 by sending voice messages 13 to the voice message server 12. Each PCD proxy 16 also receives voice messages 13 from the voice message server 12 and processes the messages in the same manner as a PCD 11 by sending the resulting sound to the telephone instrument.

In a further alternate embodiment, PCD functionality can be embedded directly into a wireless cellular telephone. Speech first is recorded by the PCD logic 20 for transmission later and received speech is first stored by the PCD logic 20 and later played to the user.

Multi-Party Message-Based Voice Communications Method

In the described embodiment, each PCD 11 is operated and controlled by the user using voice commands. A user can instruct the PCD 11 to record, review, and send a voice message 13. The user can also instruct the PCD 11 to replay older voice messages 13, skip through messages, and provide various message playback and storage management features.

During operation, a PCD 11 continuously listens for a voice input. Each PCD 11 is equipped with an "Attention" button to assist a PCD 11 in determining when a voice input is actually intended, since ambient sound and third-party voice conversations could inadvertently trigger an unintentional transmission of a voice message 13. To use the "Attention" button, a user momentarily presses and releases the button to indicate to the PCD 11 that a voice input requires parsing as operational commands. Additional buttons can also be added to duplicate the function of some or all PCD voice commands.

Although similar to two-way radio communication, PCD-to-PCD communication is transacted exclusively through the voice message server 12 and no direct peer-to-peer communications occur.

User Sign-On

To sign-on, a user operates a PCD 11 to provide authentication information that is checked against the personal information database 78 to verify the identity of the user. Once verified, a user ID 61 is added to the user and discussion group database 77 and a PCD ID is associated with the user ID 61. The user is now signed-on.

To sign-off, the user operates the PCD 11 to instruct the voice message server 12 to perform sign-off. The PCD 11 can automatically sign-off a user when the same PCD 11 is used to sign-on another user, or the PCD 11 can allow multiple users to be signed-on at the same time, such as by supporting several different system identities.

In the described embodiment, a user-name is associated with each user ID. A user can query the system to find out whether another user is signed-on by specifying a user name.

Discussion Groups

A discussion group is a list of user IDs 61. Each discussion group has a discussion group ID and an associated discussion-group-name. To join a discussion group, a user must be signed-on. The user then instructs the PCD 11 to send a control message to the voice message server 12 requesting to join a discussion group. The voice message server 12 adds an entry to the discussion group list in the user and discussion group database with the requesting user ID 61. Similarly, the user can ask to be removed from a discussion list.

When a user signs on, the message server automatically creates a discussion group whose only member is that user. The name of that discussion group is identical to the user-name of the signing on user. A user also can create and name a discussion group.

A user can query the voice message server 11 to check whether another user is a member of a discussion group that the first user has created, or to check for a list of all participating users of a discussion group.

Message Server

The voice message server 13 manages message queues for discussion groups. Upon the receipt of a voice message 13 from a PCD 11, the voice message server 12 obtains the discussion group ID 62 and adds the voice message 13 to the appropriate queue.

The voice message server 13 also scans all queues in a timely manner. For each queue, the voice message server 13 obtains a list of users that are members of that discussion list. The voice message server 13 then builds a sub-list of the signed-on users and generates a list of the PCDs 11 that are associated with the sign-on users that are members of the discussion group. The voice message server 12 takes the voice message 13 at the head of the queue and sends the message to all PCDs 11 that belong to that list. The voice message server 12 then removes the message 13 from the queue and moves to the next queue. In an alternate embodiment, the voice message server 12 keeps old voice messages, and the PCD 11 enables a user to fetch queued messages that had been delivered before the user signed on.

Discussion Group Moderator

A signed-on user who is a member of a discussion group can be the moderator of a discussion group. During a moderated discussion, the voice message server 12 first sends each voice message 13 for the discussion group to the moderator. The moderator reviews the voice message 13 and can accept or reject the message. An accepted voice message 13 is sent to the remainder of the group. The moderator also can annotate the voice message 13.

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented system for distributing messages by discussion group, comprising:
   a monitor module to monitor discussion groups;
   a verification module to verify an identity of a participant in each of two or more of the discussion groups;
   a receipt module to receive voice signals from the participant;
   a speech module to distinguish speech of the participant from ambient noise and third-party conversations in the voice signals;
   an identification module to identify one of the discussion groups specified by the participant to be associated with the voice stream; and
   a delivery module to transmit the speech as a voice message to other participants in the identified discussion group.

2. A computer-implemented system according to claim 1, further comprising:
   a personal communication device associated with the participant to transmit the voice signals.

3. A computer-implemented system according to claim 2, further comprising:
   an instruction module to receive instructions from the participant to perform at least one of listening to voice messages, forwarding voice messages, editing voice messages, and resending voice messages via the personal communication device.

4. A computer-implemented system according to claim 2, further comprising:
   a message module to receive voice messages via the personal communication device from at least one of the other participants in the identified discussion group.

5. A computer-implemented system according to claim 1, wherein the participant's identity is verified by receiving authentication information from the participant and comparing the authentication information against personal information stored for the participant.

6. A computer-implemented system according to claim 1, further comprising:
   a speech processing module to process the speech by performing at least one of decompressing, decrypting, and concatenating the speech; and
   a speech conversion module to convert the processed speech into an electrical signal for playback to the other participants.

7. A computer-implemented system according to claim 1, further comprising:
   a group formation module to add the participant to one of the discussion groups, comprising:
       a login module to receive sign-on information for a participant;
       a message receipt module to receive a control message comprising a request from the participant to join the discussion group; and
       an entry module to add an entry for the participant to the user list associated with that discussion group.

8. A computer-implemented system according to claim 1, further comprising:
   a request module to receive a request for removal of the participant from one such discussion group.

9. A computer-implemented system according to claim 1, further comprising:
   an assignment module to assign the participant as a moderator of one of the discussion groups, wherein the moderator performs at least one of accepting and rejecting each voice message received by the other participants in that discussion group.

10. A computer-implemented system according to claim 1, wherein each discussion group comprises a list of user IDs for the participants in that group.

11. A computer-implemented method for distributing messages by discussion group, comprising:
    monitoring discussion groups;
    verifying an identity of a participant in each of two or more of the discussion groups;
    receiving voice signals from the participant;
    distinguishing speech of the participant from ambient noise and third-party conversations in the voice signals;
    identifying one of the discussion groups specified by the participant to be associated with the voice stream; and
    transmitting the speech as a voice message to other participants in the identified discussion group.

12. A computer-implemented method according to claim 11, further comprising:
    transmitting the voice signals from a personal communication device associated with the participant.

13. A computer-implemented method according to claim 12, further comprising:
    receiving instructions from the participant to perform at least one of listening to voice messages, forwarding voice messages, editing voice messages, and resending voice messages via the personal communication device.

14. A computer-implemented method according to claim 12, further comprising:
    receiving voice messages via the personal communication device from at least one of the other participants in the identified discussion group.

15. A computer-implemented method according to claim 11, wherein the participant's identity is verified, comprising:
    receiving authentication information from the participant; and
    comparing the authentication information against personal information stored for the participant.

16. A computer-implemented method according to claim 11, further comprising:
   processing the speech by performing at least one of decompressing, decrypting, and concatenating the speech; and
   converting the processed speech into an electrical signal for playback to the other participants.

17. A computer-implemented method according to claim 11, further comprising:
   adding the participant to one of the discussion groups, comprising:
      receiving sign-on information for the participant;
      receiving a control message comprising a request from the participant to join the discussion group; and
      adding an entry for the participant to a user list associated with that discussion group.

18. A computer-implemented method according to claim 11, further comprising:
   receiving a request for removal of the participant from one such discussion group.

19. A computer-implemented method according to claim 11, further comprising:
   assigning the participant as a moderator of one of the discussion groups, wherein the moderator performs at least one of accepting and rejecting each voice message received by the other participants in that discussion group.

20. A computer-implemented method according to claim 11, wherein each discussion group comprises a list of user IDs for the participants in that group.

* * * * *